United States Patent [19]
Brock

[11] 3,742,356
[45] June 26, 1973

[54] TESTING APPARATUS FOR LIGHT EMITTING DIODES AND METHOD THEREFOR

[75] Inventor: Leslie E. Brock, Saratoga, Calif.

[73] Assignee: Kerant Electronics Ltd., Santa Clara, Calif.

[22] Filed: Sept. 7, 1971

[21] Appl. No.: 178,342

[52] U.S. Cl. ............................................. 324/158 D
[51] Int. Cl. ........................................... G01r 31/26
[58] Field of Search .................... 324/158 D, 20 R, 324/158 T, 158 R, 73 R; 307/311; 313/108 D; 317/235 N

[56] References Cited
UNITED STATES PATENTS
3,308,452  3/1967  Michel et al. ................. 313/108 D OTHER PUBLICATIONS
Elion, H. A.: Laser Systems...; Pergamon Press, 1967; pgs. 1A, 1B, and 32–39.

Primary Examiner—Rudolph V. Rolinec
Assistant Examiner—Ernest F. Karlsen
Attorney—Flehr, Hohbach, Test, Albritton & Herbert

[57] ABSTRACT

Light emitting diode testing apparatus and method sequentially couples a common voltage source to a number of diodes equal to the reciprocal of their duty cycle and applies to them a voltage magnitude to produce a current equal to the reciprocal of the duty cycle times the average current rate to thereby effectively test the diodes for poor die attaches or lead bonding.

5 Claims, 3 Drawing Figures

TESTING APPARATUS FOR LIGHT EMITTING DIODES AND METHOD THEREFOR

BACKGROUND OF THE INVENTION

The present invention is directed to apparatus for testing light emitting diodes and a method therefor.

Prior devices for testing light emitting diodes (L.E.D.) required eight individually calibrated forward constant current sources. This tested the seven segments and the decimal point of a typical L.E.D. display package. The constant current sources were used to guarantee that all segments could be compared for uniformity of brightness.

However, this technique inherently cannot check for variations in the dynamic resistance of individual segments. Such variations are caused by poor lead bonds or poor die attaches. Besides producing gross variation in brightness which cannot be detected by the constant current method of the prior art, the poor bonds or attaches can result in total failure of a device under actual operating conditions.

OBJECTS AND SUMMARY OF THE INVENTION

It is, therefore, a general object of this invention to provide an improved testing apparatus for L.E.D.'s and a method therefor.

It is another object of the invention to provide an apparatus and method as above which tests for bad die attaches or lead bonds.

It is another object of the invention to provide an apparatus and method where L.E.D.'s are stressed in their worst case operational environment.

In accordance with the above objects there is provided testing apparatus for light emitting diodes arranged in segments to form an alpha-numeric display which are in unitary integrated circuit type packages. Such packages have one common terminal and individual terminals for each of the segments. The light emitting diodes have an average current rating. The apparatus comprises a plurality of sockets for receiving the circuit packages and a single voltage source. Sequencing means are provided for successively coupling the voltage source to the common terminals of each package inserted in a socket. The sockets are sequenced at a predetermined rate with the number of sockets being sequenced equal to the reciprocal of a duty cycle at which the diodes are being tested. The magnitude of the voltage being supplied by the source is chosen to produce an instantaneous current through a light emitting diode which is the product of the reciprocal of the duty cycle and the average current rating.

DETAILED DESCRIPTION OF THE PREFERRED EMBODIMENT

Figure 1:
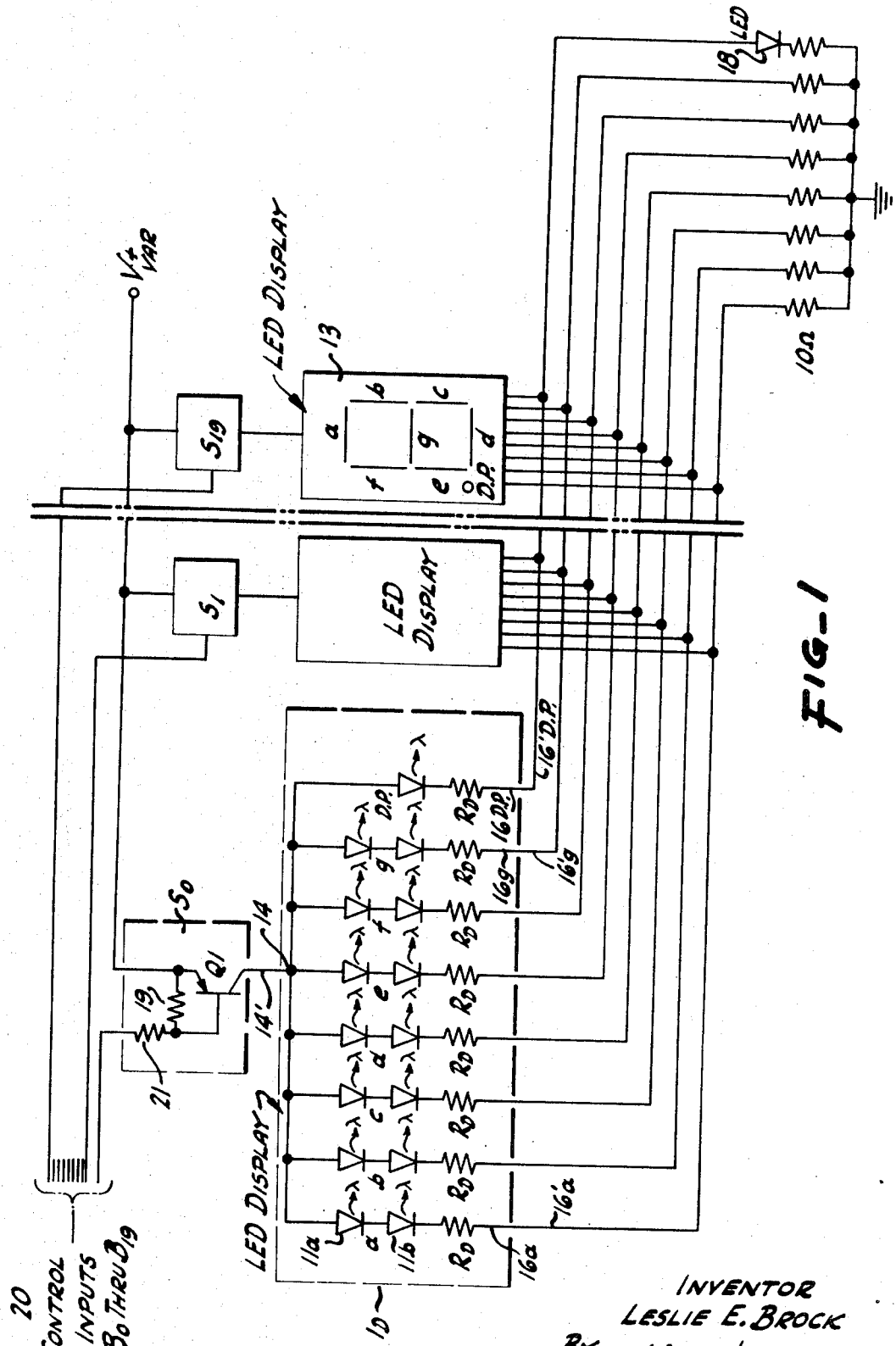
FIG. 1 is a block diagram of a portion of the testing apparatus embodying the present invention.

FIG. 1 illustrates in diagrammatic format the actual testing apparatus of the present invention which is suitable for testing 20 light emitting diode display packages. Enclosed within the dashed block 10 is a typical integrated circuit type of light emitting diode display package which, for example, may be of the dual in line flat pack type. This package contains a plurality of light emitting diodes arranged in two diode segments designated 11a, 11b along with the internal dynamic resistance of the diodes designated $R_D$. In the block 10, seven segments, a through g, are indicated along with a single diode for forming a decimal point, (D.P.). In actual practice, a numeric display is formed by arranging these segments in the form shown in display 13. This is a typical figure eight alpha-numeric display with associated decimal point.

Referring again to the dashed block 10, each integrated circuit type L.E.D. package or display has a common anode terminal 14 and individual terminals $16a$ through $g$ and $16_{D.P.}$ which in this case are coupled to the cathodes. These terminals are all connected to pins on the integrated circuit type package which are then inserted into the sockets of the testing apparatus. Such sockets are indicated in the drawing by the primed numbers $14'$, $16'a - g$ and $16'_{D.P.}$ in association with the L.E.D. corresponding leads.

Each L.E.D. display package as supplied by the manufacturer has an average current rating of, for example, 20 milliamperes per segment and there is also specified a duty cycle of, for example, 5 percent. This means, as will be discussed in greater detail below, that the peak current to which a diode package or the individual diodes of a display may be subjected to may be as high as the reciprocal of the duty cycle; for example, 20 times the average per segment current, 20, which is 400 milliamperes. Socket terminals $16'a - g$ and $16'_{D.P.}$ are coupled to ground through 10 ohm resistors which are for the purpose of calibration. The $16'_{D.P.}$ socket terminal, since it is associated with a light emitting diode segment having only one emitting diode has included in series with the 10 ohm resistor an additional light emitting diode 18.

Twenty light emitting diode displays, that is, the reciprocal of the duty cycle are sequentially driven by switching circuits $S_0$ through $S_{19}$ from a common single voltage source $V_+$ which is variable to allow for calibration of the testing apparatus so that the proper peak current is supplied to the diodes. As discussed above, this instantaneous current is equal to the product of the reciprocal of the duty cycle and the average current rating of the diodes. A typical switch $S_0$ is shown in detail which includes a transistor Q1 and biasing resistors 19 and 21.

The L.E.D. displays are activated with a proper duty cycle by sequentially activating each switch $S_0$ through $S_{19}$ by 20 control inputs $B_0$ through $B_{19}$ to the respective switches.

Figure 2:
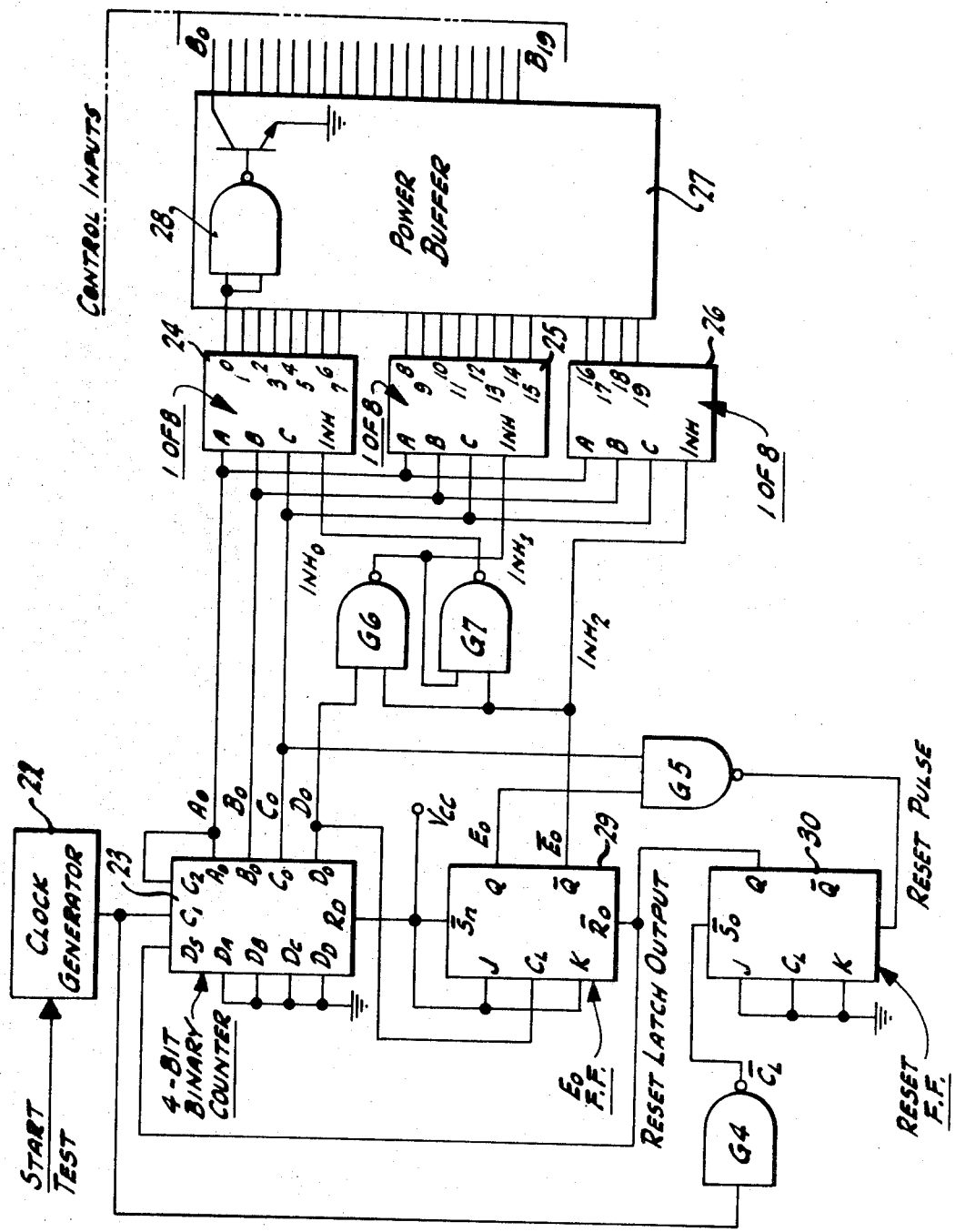
FIG. 2 is a block diagram of another portion.

The sequencing apparatus is shown in FIG. 2 and includes a clock generator 22 responsive to an indication on a "start test" line for initiating the sequencing of the diodes. A typical refresh rate might be 1 kilohertz. The clock generator and associated circuitry also determines the stopping of the testing which in order to test the devices under actual operational environment should be not less than 2 minutes. With the application of a peak current rather than an average current to the diodes, this guarantees that any defects especially in bonding or die attaches will be stressed to a worst case environment and either produce a display of markedly less brightness or a total lack of display in one of the diode segments due to a blown out link.

Figure 3:
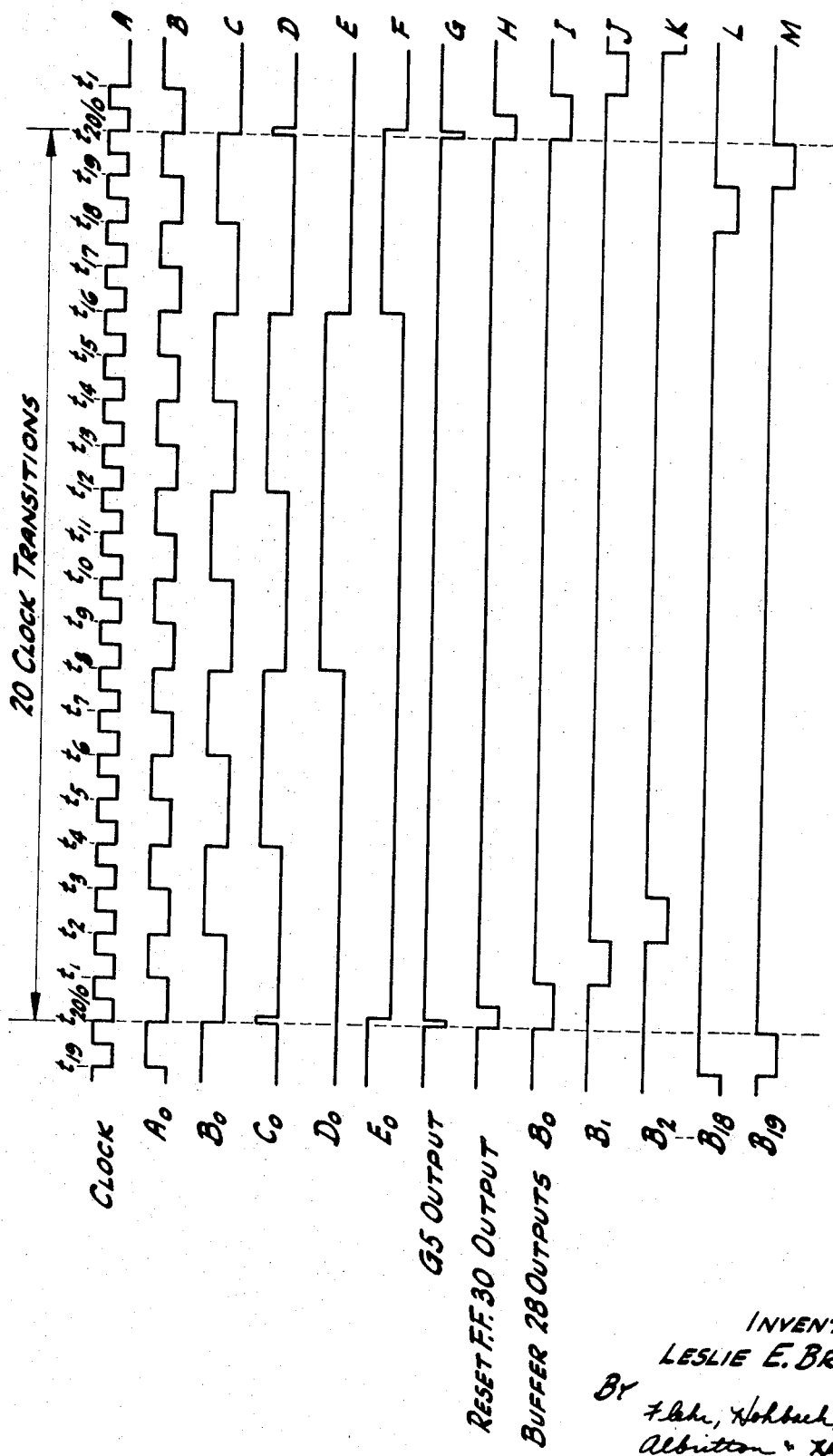
FIGS. 3A through 3M are timing diagrams useful in understanding the present invention.

Clock generator 22 drives a 4-bit binary counter 23 which has binary outputs $A_0$, $B_0$, $C_0$ and $D_0$. FIG. 3A shows the clock pulses and FIGS. 3B, C, D and E the outputs of the counter. The $A_0$, $B_0$, $C_0$ binary counter outputs are coupled to three out of eight decoders 24, 25 and 26. As is apparent each decoder has eight outputs which in the case of decoders 24 and 25 are designated 0 through 7 and 8 through 15 respectively and in the case of decoder 26 only the outputs 16 through 19 are used. These are coupled into a power buffer 27 which then provides the control inputs $B_0$ through $B_{19}$ which are used to sequence the display as discussed in connection with FIG. 1. A typical buffer 28 is shown.

In order to provide proper sequencing of decoders 24, 25, 26 inhibit leads designated $INH_0$, $INH_1$ and $INH_2$ insure that only one decoder will be operating at a time and that at the completion of the operation of one the next will be activated. This circuitry includes the NAND gates G6, G7 which are driven by the $D_0$ binary output of counter 23 and by an $\bar{E}_0$ output of $E_0$ flip-flop 29. In operation, $INH_0$ is initially high to activate decoder 24. Thereafter the G6 NAND gate is activated by the $D_0$ output of counter 23 since as illustrated in FIG. 3E this goes high on the eighth pulse of the clock generator. The output of flip-flop 29 is illustrated in FIG. 3F where $E_0$ output de-activates G6 and G7 to ensure that decoders 24 and 25 are inhibited. A reset flip-flop 30 is responsive to the output of NAND gate G5 (see FIG. 3G) which occurs every 20th pulse of the clock generator. This in turn is coupled to flip-flop 29 and counter 23 to reset those devices.

The foregoing sequence is repeated for at least 2 minutes until all defective devices being tested are detected. FIGS. 3I, J, K, L and M indicate the sequential activation of the buffer outputs $B_0$ through $B_{19}$ which individually and successively couple the voltage source to the common terminals of the light emitting diode display packages.

Thus, the present invention has provided improved apparatus and method for testing light emitting diodes. Moreover, they are tested in their worst case operational environment by both taking the duty cycle into account and testing them with a peak instantaneous current. This is accomplished in a simple and economical manner by the testing of a number of diodes equal to the reciprocal of the duty cycle. In addition, the testing is carried on long enough to detect defective devices.

I claim:

1. Testing apparatus for light emitting diodes arranged in segments to form an alpha-numeric display which are in unitary integrated circuit type packages, such packages having one common terminal and individual terminals for each of said segments, said light emitting diodes having an average current rating, said apparatus comprising: a plurality of sockets for receiving said circuit packages; a single voltage source; sequencing means for successively coupling said voltage source to said common terminals of each package inserted in a socket, said sockets being sequenced at a predetermined rate, the number of sockets being equal to the reciprocal of a duty cycle at which said diodes are being tested the magnitude of voltage being chosen to produce an instantaneous current through a light emitting diode which is the product of the reciprocal of said duty cycle and said average current rating.

2. Testing apparatus as in claim 1 where said duty cycle is 5 percent and the number of sockets is 20.

3. Testing apparatus as in claim 1 where said sequencing means includes a clock generator for determining said predetermined sequencing rate, a binary counter responsive to said clock generator for counting, a plurality of binary decoders responsive to the binary output of said counter for individually and successively coupling said voltage source to the common terminals of said light emitting diodes.

4. Apparatus as in claim 3 including means responsive to the binary output of said counter for selectively inhibiting all of said decoders except one.

5. A method for testing light emitting diodes arranged in segments to form an alpha-numeric display which are in unitary integrated circuit type packages, such packages having one common terminal and individual terminals for each of said segments, said light emitting diodes having an average current rating, said method comprising the steps of applying a voltage of predetermined magnitude sequentially to the common terminals of a plurality of said circuit packages, said plurality being equal to the reciprocal of a duty cycle at which it is desired to test said diodes, said voltage magnitude being chosen to produce an instantaneous current through a light emitting diode which is the product of the reciprocal of said duty cycle and said average current rating.

* * * * *